United States Patent
Niwa et al.

[15] 3,689,679
[45] Sept. 5, 1972

[54] DEVICE FOR CONTINUOUS LIQUEFACTION OF SILICEOUS MATERIAL

[72] Inventors: Shohei Niwa, Mizunami; Kazuo Oki, Okazaki; Masaaki Hayashi, Nagoya; Yuukichi Morimoto, Kariya, all of Japan

[73] Assignee: Glasrock Products, Inc., Atlanta, Ga.

[22] Filed: March 8, 1971

[21] Appl. No.: 121,974

[30] Foreign Application Priority Data

March 12, 1970 Japan ..................... 45/20660
July 2, 1970 Japan ..................... 45/57547

[52] U.S. Cl. .......................... 13/6, 65/324, 65/327, 65/347, 65/356
[51] Int. Cl. .......................... C03b 5/02, C03b 17/00
[58] Field of Search .... 13/6, 9; 65/18, 347, 356, 325, 65/326, 327, 324

[56] References Cited

UNITED STATES PATENTS 3,109,045  10/1963  Silverman ............. 65/347 UX
3,147,328   9/1964  De Bussy ........................ 13/6

FOREIGN PATENTS OR APPLICATIONS 400,472  10/1933  Great Britain ................. 13/6

*Primary Examiner*—Roy N. Envall, Jr.
*Attorney*—Douglas M. Clarkson

[57] ABSTRACT

An apparatus and method for the continuous liquefaction of finely divided raw material capable of forming a highly viscous material when heated to molten condition, the apparatus including a hollow vessel, means for constricting the bottom opening of the vessel, means for adding the finely divided material into the vessel at the same time the viscous material is removed through the bottom opening of the vessel, a pair of horizontally disposed electrodes in the vessel for producing an electrical arc to generate sufficient heat to form a molten viscous melt from the raw material, and means for removing the molten viscous melt from the vessel at substantially the same rate as the melt is formed for maintaining a stable condition within the vessel. The disclosed method continuously forms a viscous extrusion melt from finely divided raw material which is charged into the vessel, the melt being withdrawn by gravity or by rollers and broken or severed periodically. The conversion of silica i.e. sand into fused silica is disclosed.

44 Claims, 16 Drawing Figures

INVENTORS
SHOHEI NIWA
KAZUO OKI
MASAAKI HAYASHI
YUUKICHI MORIMOTO
BY
*Newton, Hopkins & Ormsby*
ATTORNEYS

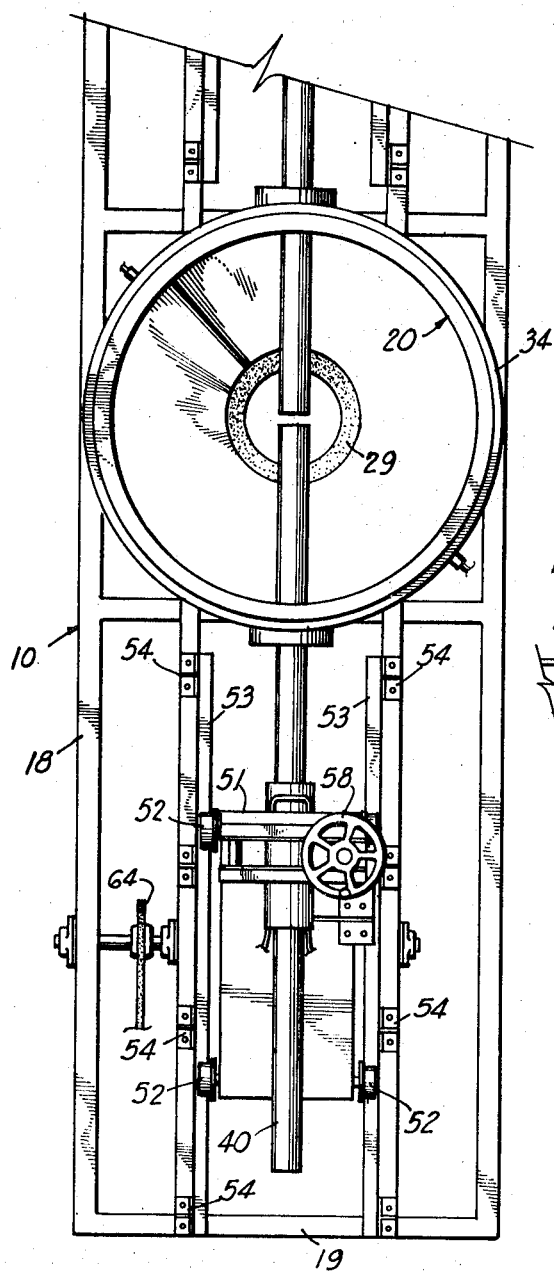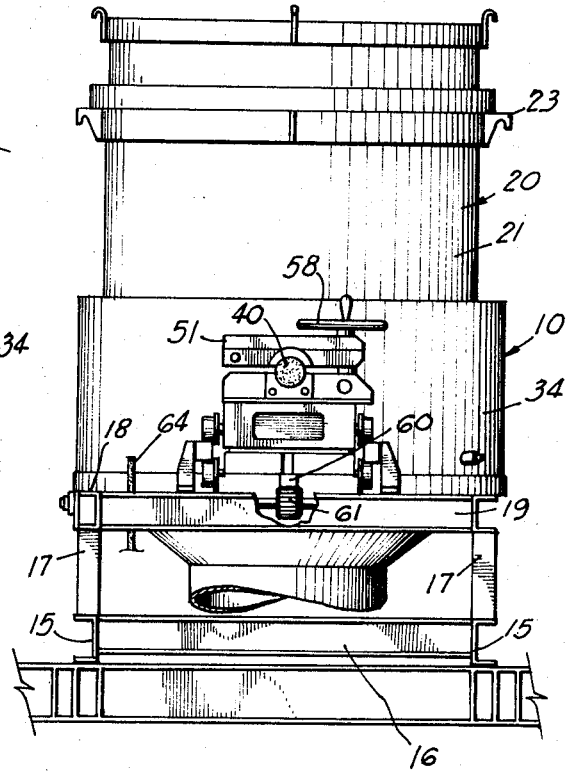
FIG 3
FIG 4

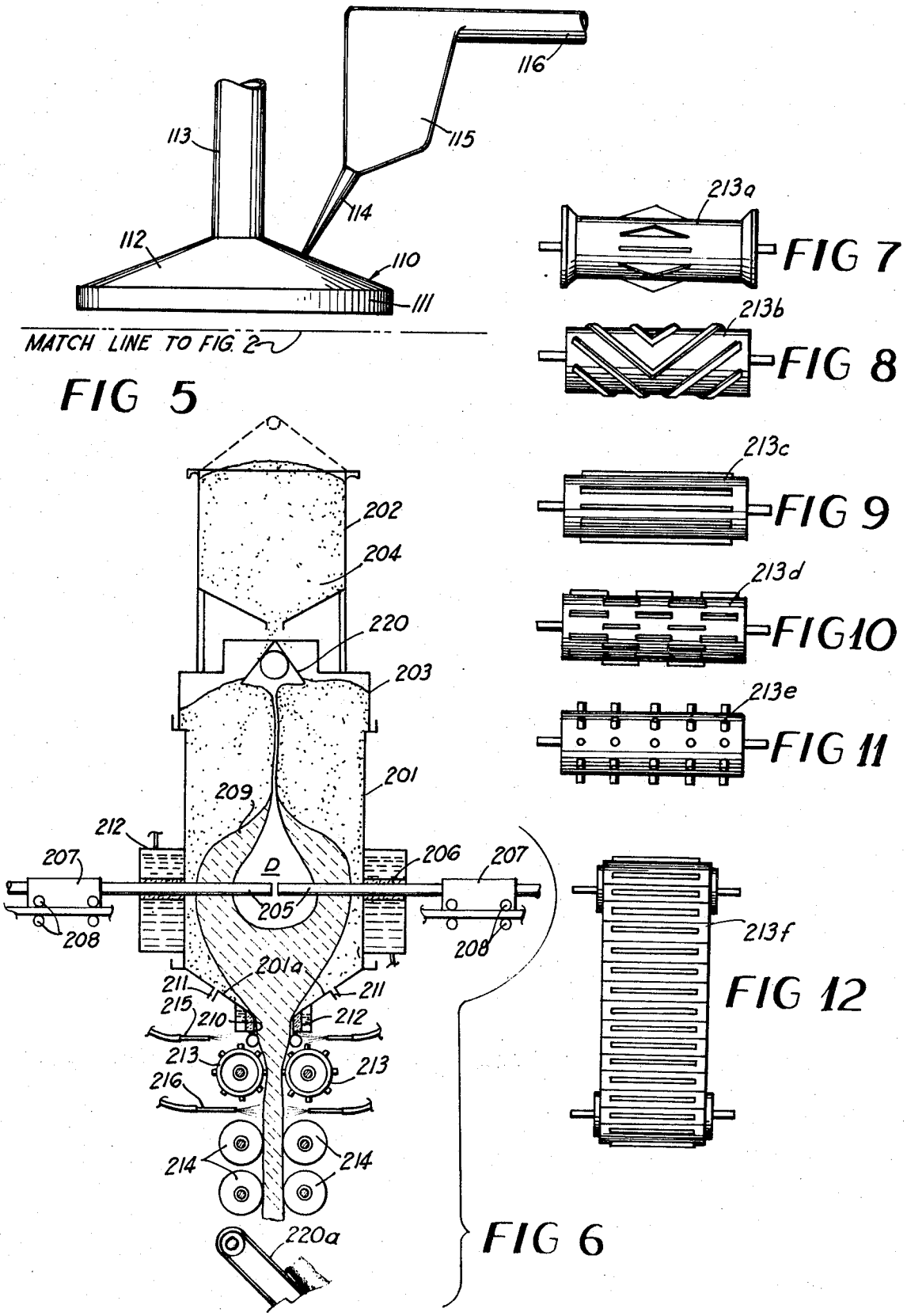

DEVICE FOR CONTINUOUS LIQUEFACTION OF SILICEOUS MATERIAL

BACKGROUND OF THE INVENTION

This invention relates to a method and apparatus for the continuous liquefaction of finely divided raw material and more particularly to the production of fused silica from silica raw material.

Fused silica (also known as amorphous silica, silica glass or quartz glass) in finely divided form, as a raw material has recently been demanded in large quantities. Devices for preparing fused silica have been developed in the past. Such prior art devices comprising carbon electrodes, disposed in the center of a housing, charged with granular or powdered siliceous material, such as sand. Current, passed through the electrodes, produced an electrical arc which generated sufficient heat to permit the material surrounding the electrodes to be melted into a hollow globe-like melt. The current was then turned off and the globe removed from the housing by various means, such as by inverting the housing.

The melt would then be allowed to cool. As it cooled, the various impurities and contaminants in the melt, such as iron, oxides of iron, alkali metals, oxides of alkali metals, silicates, aluminum compounds, and titanium compounds, being more mobile than the fused siliceous material, would tend to be concentrated in the cooler area around the outside of the surface of the melt. As a result, a contaminated skin would form around the cool fused siliceous material which required removal before further work could be done on the melt. The skin was removed by a "peeler" stripping or hammering away at the skin and, in effect, peeling the skin from the surface of the melt.

Once the skin was removed, the fused silica would then be comminuted to a granular, powdered or finely divided state and used according to its purity. Meanwhile, the obviously non-continuous method of producing the fused silica melt would be carried out, again. Unused sand from the previous melt would be recycled and used with the new batch of sand, thus trapping a higher concentration of impurities from the old sand with the new sand. The resultant melts would then have thicker skins to be peeled off.

This old batch process had still other drawbacks, such as a high electrical power consumption, necessitated by the requirement to generate an electrical arc of sufficient intensity to heat to fusion temperature each batch of raw material. Since there was never any conservation of this heat, from one batch production of the melt to the next, the electrical power consumption was, in turn, very high. Also, the amount of fused silica produced by this old method and apparatus was inefficiently small. Another drawback was that, since the electrodes were not continually generating an electrical arc, there was a high consumption of these electrodes since they were heated and cooled during each cycle intermittently. U.S. Pat. No. 3,151,964 discloses the old process discussed above.

A method of continuously preparing fused silica by flowing the melt downwardly through extrusion nozzles was disclosed in the British Pat. No. 400,472. However this method of continuous liquefaction has had no practical application because of the extreme difficulty in maintaining a stable furnace situation. This situation is due mainly to the extremely unstable environment in the arc generating section of the furnace. The determining factors in the stabilization of the furnace situation have not yet been clarified. Probably these factors are viscosity, temperature, etc. as for the raw material, and current, voltage, electrodes, etc. for the temperature. Also, there is the relationship between the amount of extruded melt and the supply of raw material.

SUMMARY OF THE INVENTION

Briefly described, the apparatus of the present invention included a furnace or vessel having a hollow cylindrical, water jacketed body, the bottom wall portion being frusto-conical, and tapering abruptly inwardly and downwardly from the lower edge of the cylindrical body to terminate in a depending hollow cylindrical discharge nozzle, which is also water jacketed. An annular throat defining lip of refractory material, is retained by and forms a lining for the nozzle. Below the nozzle, in removable coaxial abutting relationship thereto, is a tubular, water jacketed, solidification sleeve which provides a cooling passageway, through which the molten material passes. A hood or cover for the escape of gases generated by the electric arc is disposed over the upper end of the body and a raw material make up conveyor, for maintaining an appropriate level of raw material in the body of the furnace, feeds into a chute connected to the hood.

For temporarily closing the open bottom of the furnace, so that an initial charge of granular or powdered raw material can be received and melted sufficiently to form a seal against the annular lip, is a cup shaped bottom cap provided with a gate type bleeder valve. The bottom cap is carried on a vertically moveable elevator which holds the cap in place for the initial start up and bleeding of raw material from the furnace sufficiently for the molten melt seal at the throat. Thereafter, the elevator alone may provide support for the lower end of the gradually descending molten column of viscous material passing from the nozzle through the sleeve.

In a second embodiment of the invention, opposed endless primary conveyors, having various surface configurations, are substituted for the elevator and function, during the main run of the furnace, for gradually feeding the emerging column of molten material. An angled secondary conveyor functions to break the column periodically and convey away the resulting product.

The method performed by the above apparatus include surrounding an electric arc with siliceous raw material, such as sand, so as to create a globe of fused, molten, liquified viscous silica melt which gradually grows, as the raw material is withdrawn from supporting the bottom of the globe through the restricted nozzle. Eventually, the liquified fused silica globe grows to such an extent that it seals off the throat of the nozzle, thereby preventing further discharge of the raw material by gravity from within the body of the furnace. Thereafter, the lower portion of the globe flows by gravity as a column through the nozzle so that it can be removed substantially at the rate at which the fused silica is formed, the impurities which migrate to the surface of the melt having been scraped off by the annular lip.

It is, therefore, a primary object of the present invention to provide an apparatus and method for producing, in a continuous fashion, a fused silica product from siliceous raw material.

Another object of the present invention is to provide an apparatus and process of liquifying fuseable raw material which will reduce to a minimum the electricity consumption and increase the production rate.

Another object of the present invention is to provide an apparatus and process for producing fused silica which will result in an improved product having essentially no contaminates and containing no "skin" which must be peeled from the product.

Another object of the present invention is to provide a process an apparatus for producing fused silica in which the contaminates are removed during the production of the fused silica.

Another object of this invention is to provide a method and apparatus for the continuous liquefaction of finely divided siliceous material which produces a very high quality fused silica product.

Another object of this invention is to provide an apparatus for the continuous liquefaction of finely divided siliceous material which is simple in construction and use, economical to manufacture, and reliable in operation.

Still other objects features and advantages of the present invention will become apparent from the following description when taken in conjunction with the accompanying drawings of the illustrative embodiments of the invention, wherein like reference characters designate corresponding parts throughout the several views, and wherein:

BRIEF DESCRIPTION OF THE FIGURES OF DRAWINGS

FIG. 3 is a fragmentary top plan view of the apparatus of FIG. 2;

FIG. 4 is a fragmentary end view of a portion of the apparatus shown in FIG. 2;

FIG. 5 is an side elevational view of the top portion or cover of the apparatus of FIG. 2 for disposition along the match line therein;

FIG. 6 is a schematic vertical sectional view on a reduced scale, showing a second embodiment of the apparatus of the present invention;

FIGS. 7 through 12 are enlarged side elevational views of various extruding rollers which may be employed in the embodiment of FIG. 6; and FIGS. 13 through 16 are schematic vertical sectional views of the apparatus of FIG. 1 through 4 in operation.

DETAILED DESCRIPTION OF THE DRAWINGS

Figure 2:
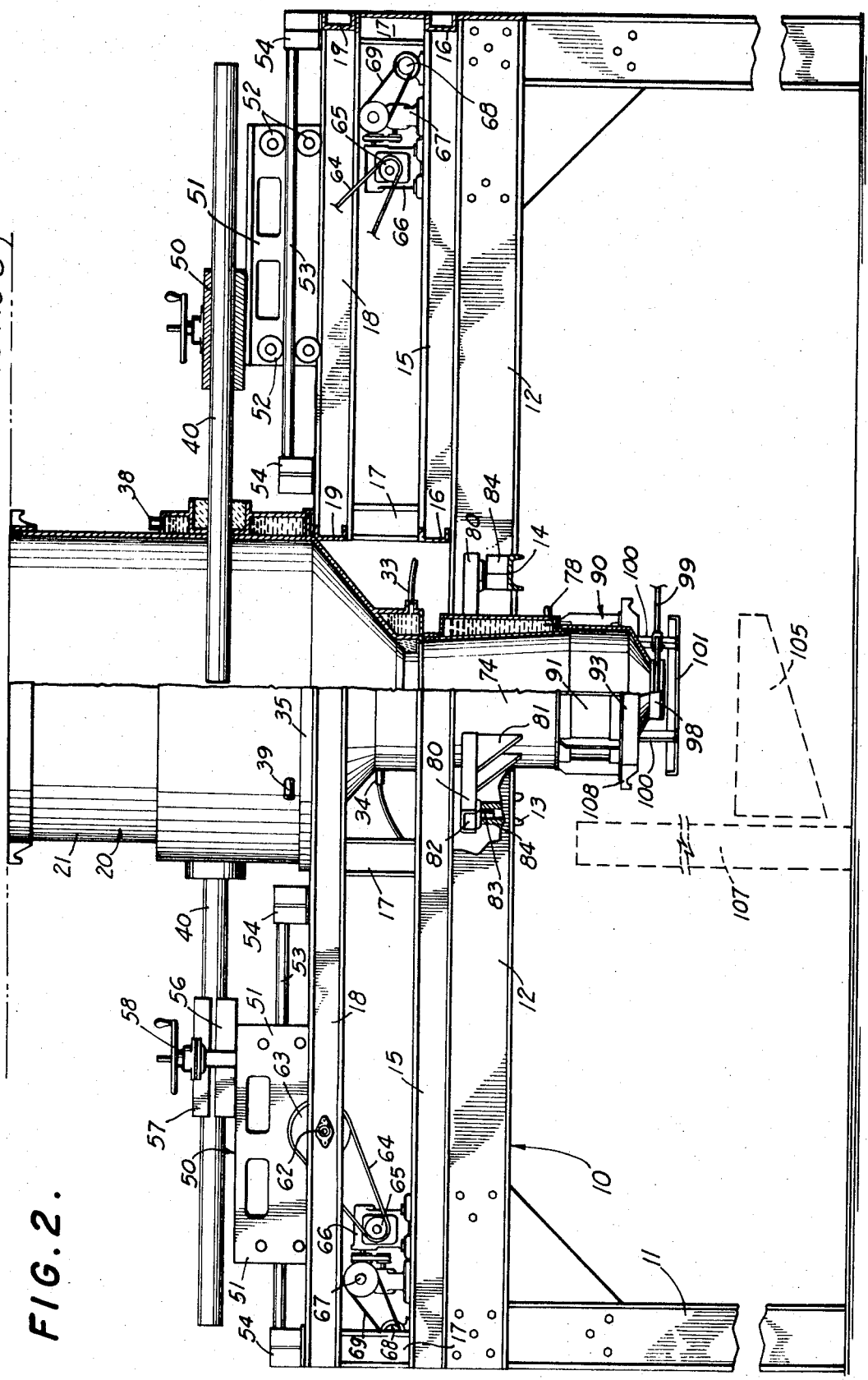
FIG. 2 is a fragmentary side elevational view of the apparatus shown in FIG. 1, certain parts being broken away for clarity and having a match line referring to FIG. 5.
Figure 14:
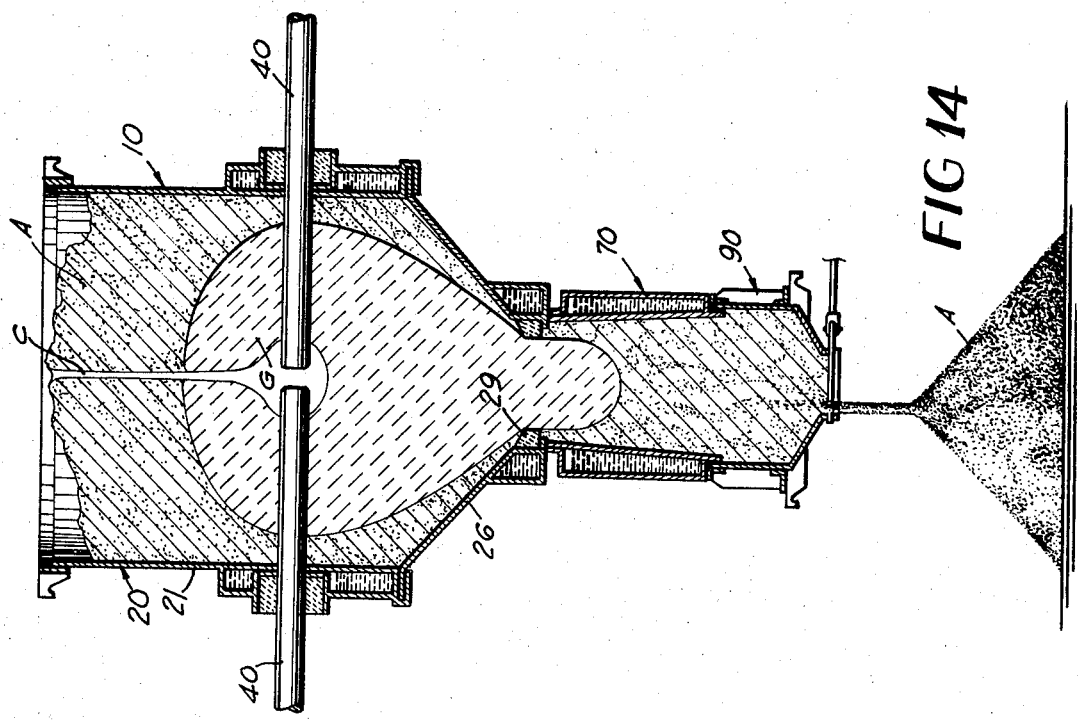

Referring now in detail to the embodiments chosen for the purpose of illustrating the present invention, and particularly to FIG. 2 thereof, it will be seen that a frame denoted generally by numeral 10 includes a plurality of upstanding legs 11 which support the corners of a horizontal cooling sleeve supporting lower frame having longitudinally extending outer beams 12 connected by transverse beams, such as beams 13 and 14. Spaced inwardly from the longitudinal beams 12 are smaller longitudinal beams 15 which are mounted on the horizontal frame, and are provided with transverse beams, such as beams 16. Spaced upstanding studs 17 on the subframe formed by the beams 15 and 16 support an upper frame which includes longitudinal beams 18 which, in turn, are spaced apart by cross struts, such as struts 19.

Centrally located on the frame 10 is the furnace or fusion vessel, denoted generally by numeral 20. This fusion vessel includes a fusion chamber into which is charged the granular or powdered raw material A which is to be fused.

The furnace 20 includes a hollow cylindrical main body 21 having a vertical axis. The upper end portion of body 21 is provided with a annular lifting ring 22 from which project four equally spaced lifting brackets 23. The lower end of the body 21 is provided with an outwardly protruding annular flange 24 which abuts a complimentary flange 25 on the bottom 26 of the fusion furnace 20. The bottom 26 is an inverted frusto-conical member which tapers downwardly and inwardly to terminate in a depending cylindrical nozzle 27.

The nozzle 27 projects a short distance downwardly and terminates in an annular, lip supporting, flange 28 which protrudes inwardly and outwardly of nozzle 27. The inner peripheral portion of flange 28 provides a supporting shoulder for an annular lip 29. This lip 29 is formed of a refractory material and is so dimensioned as to be snuggly received by the nozzle 27 to form a liner therefor, the upper edge portion of the lip 29 tapering downwardly and inwardly with the same slope and coinciding with the slope of the bottom 26 so as to form essentially an extension thereof. The lip 29 defines a throat or bottom opening for the nozzle, through which the molten or fused material, such as fused silica G may flow during the fusion operation.

To protect the lip 29 from the intense heat of the fusion melt G, a water jacket is provided around the nozzle 27, the water jacket being formed by the outer protruding portion of the flange 28 and an upstanding annular ring 30 which extends from the outer periphery of flange 28 to a position intermediate the inner and outer peripheries of the fusto-conical bottom 26. The water jacket 31 is thus defined by the nozzle 27 which forms the inner periphery of the jacket, the ring 30 which forms the outer periphery thereof, the flange 28 which forms the bottom and a portion of the bottom 26 which forms the top. Suitable intake and outlet nipples 32 and 33 are provided for the circulation of water to and from the water chamber of jacket 31.

For cooling the main body 21, a similar water jacket is provided surrounding the lower portion of body 21 this water jacket is defined by an annular ring 34 which is mounted on an annular channel 35 which clamps the flanges 24 and 25 in their abutting relationship. The water jacket is also defined by an upper annular plate 37 which protrudes inwardly from the upper edge of the ring 34 to an intermediate portion of the body 21. Suitable inlet and outlet nipples 38 and 39 provide for the circulation of the water within the water jacket just described.

Figure 1:
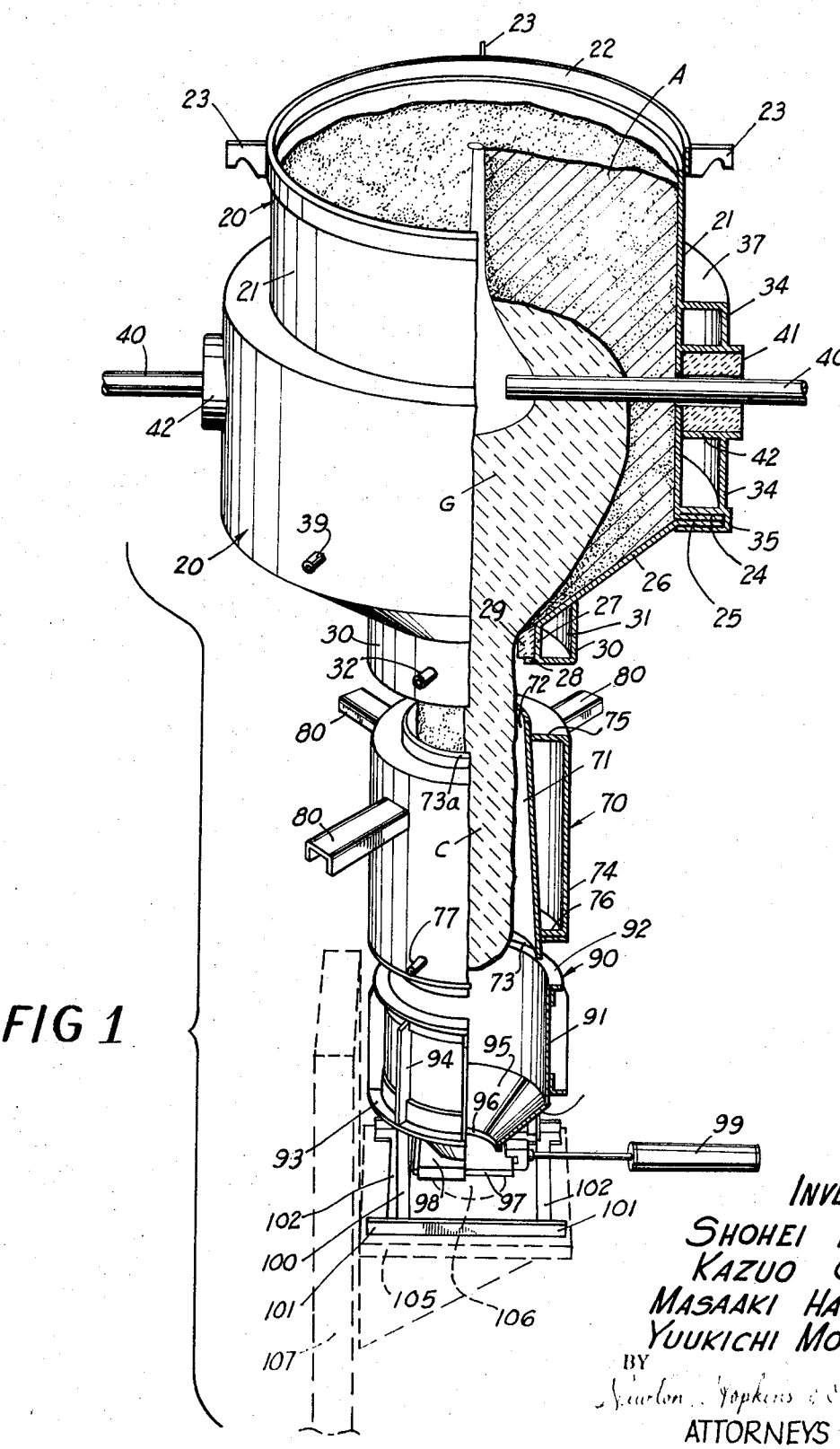
FIG. 1 is an exploded fragmentary prospective view of an apparatus constituted in accordance with the present invention, certain parts being broken away for clarity.

The opposed horizontally disposed electrodes 40 protrude through central portions of the ring 34 and thence through the body 21 so as to terminate in the central portion of the fusion chamber defined by body 21 in opposed aligned relationship. Annular insulation blocks 41 carried by cylindrically shaped housings 42 surround the electrodes 40, the inner ends of the housings 42 abutting the outer surface of body 21 and the peripheral portions of housings 42 being secured through holes in ring 34, as illustrated in FIG. 1.

It will be understood that the electrodes 40 are capable of being moved inwardly and outwardly in an axial direction, i.e., a radial direction with respect to the vertical axis of the furnace, so that the arc gap between the inner ends of the electrodes 40 may be varied, as desired. For this purpose, electrode carriers, denoted generally by numeral 50 are provided on the frame 10, on opposite sides of the furnace 20. Each carrier 50 includes a carriage 51 which is provided with flanged wheels 52 riding upon opposed longitudinally extending rails 53. The rails 53, in turn, are carried by upstanding brackets 54 on the beams 18.

Mounted on the central portion of the carriage 51 is electrode clamping assembly having opposed upper and lower clamping jaws 56 and 57. These clamping jaws are hingedly secured together along a common edge and are releasably clamped by their other edges by means of a crank mechanism 58.

By movement of the carriage 51 inwardly and outwardly, the depth of penetration of the electrode 40 into the chamber defined by the body 21 may be varied, as desired. For moving the carriage 51 inwardly and outwardly with respect to the body 21, the lower portion of the carriage is provided with a rack 60 having downwardly opening teeth which mesh with a pinion 61 carried on a shaft 62 which shaft is journaled by the longitudinally extending beams 18. Outwardly of the beam 18, shaft 62 is provided with a pulley 63 driven by a belt 64 from a pulley 65 on a gear reducer 66. To provide for very slow movement of the shaft 62, the gear reducer 66 is driven from a gear reducer 67 which, in turn, is driven by a motor 68 through belt 69. The gear reducers 66 and 67, as well as the motor 68 is mounted on beams 15, as best seen in FIGS. 2, 3 and 4.

Since the body 21 may be dumped periodically to permit the cleaning of the interior of the furnace and, particularly the cleaning of impurities from the bottom 26, the annular channel 35 carries substantially the entire weight of this body 21, the channel resting upon the beams 18 and the central struts 19.

Below and coaxially aligned with the body 21 so as to receive and cool the column C of fused silica or other melted viscous material, a cooler or cooling sleeve, denoted generally by numeral 70 is provided. In more detail, this cooling sleeve includes a frusto-conical inner sleeve 71 which diverges downwardly and outwardly, thereby providing an upper entrance opening 72 which is slightly smaller in diameter than the lower exit openings 73 thereof. The upper entrance opening 72, however, is of larger diameter than the throat of the lip 29 so that the upper edge 73a of the sleeve 71 abuts the bottom surface of flange 28.

The inner sleeve 71 is surrounded by outer cylindrical sleeve 74 which is disposed concentrically with respect to sleeve 71 and is connected thereto by upper annular wall 75 and lower annular wall 76. The sleeves 71 and 74, together with the walls 75 and 76 define a water chamber through which a coolant is passed, the outer cylindrical sleeve 74 being provided with nipples 77 and 78 for that purpose.

Four radially extending circumferentially evenly spaced channel shaped trunnions 80 project outwardly from the outer sleeve 74 and are provided with appropriate gussets 81 for reinforcement. The outer ends of these trunions 80 carry blocks 82 from which project, downwardly extending alignment pins 83 which are received in the upper ends of bearing blocks 84. The bearing blocks, in turn, are carried by the transverse beams 13 and 14. It is therefore seen that when the body 21 is removed from its position on the frame 10 the cooling sleeve is free to be lifted upwardly and out of the frame 10, as well.

As seen best in FIG. 1, below the cooling sleeve 70 is a cup shaped cap, denoted generally by numeral 90. This cup shaped cap 90 is used only during the initial start-up of the furnace and may thereafter be dispensed with. The cap 90, itself, includes an annular cylindrical body 91 provided with a flat upper annular flange 92 and a flat lower annular flange 93. For convenience, the flanges 92 and 93 are L-shaped so that they may be readily secured to the cylindrical body 91. Vertically disposed reinforcing ribs 94 are disposed circumferentially around the outside surface of the body 91, these ribs 94 extending between the upper flange 92 and the lower flange 93 and being equally spaced apart circumferentially.

The diameter of the body 91 is slightly larger than the diameter of the protruding lower discharge end 73 of the inner sleeve 71 so that this protruding end portion may be received within the upper end portion of the body 91 in overlapping relationship.

The lower end of the body 91 is provided with a frusto-conical bottom 95 which, like the bottom 26 tapers downwardly and inwardly to terminate in an annular discharge nozzle 96. The opening in discharge nozzle 96 is closed by a gate valve which includes a radially mounted slideable plate 97 seen best in FIG. 1. The plate 97 is carried by a rack 98 secured to the nozzle 96. This rack 98 includes a flat plate carried by bottom 96 and disposed above the slideable plate 97 the opposed edges of the rack 98 being curved downwardly and then inwardly to define a pair of opposed channel members receiving the edge portions of the plate 97. A suitable handle 99, which protrudes radially outwardly of the plate 97, permits manipulation of this plate so as to open and close the nozzle 96, as desired.

Legs 100 project downwardly from the lower flange 98, the lower ends of the legs 100 being secured at the corners of a horizontally disposed cap supporting frame formed of longitudinally extending angle irons 101 and transversely extending angle irons 102. This lower supporting frame defined by the angle irons 100, 101 is adapted to be carried by an elevator 105, shown in broken lines in FIGS. 1 and 2. Elevator 105 has an appropriate opening 106, seen in FIG. 1 through which the sand or raw material may flow, when the gate valve plate 97 is manipulated to open nozzle 96. The elevator 105 is provided with an appropriate support 107 by means of which the elevator 105 may be manipulated in a vertical path upwardly and downwardly.

The cap 90 is also provided with outwardly projecting radially spaced lugs 108 which are secured to the flange 93 to facilitate the handling of the cap 90 so as to secure the same in place by means of chains (not shown) which may be wrapped around the frame 10.

For the purpose of venting gases generated by the electric arc during the fusion of the silica raw material, or like material, a hood or cover 110, shown in FIG. 5, is disposed over the upper end of body 21. This cover has a cylindrical skirt 111 and a frusto-conical or truncated funnel 112 which leads from the skirt 111 to a discharge conduit 113.

Projecting through the funnel 112 of the cover 110 is a tubular chute 114 which leads from a raw material storage bin 115. The raw material which is fed by the conveyor 116 falls through the bin 115 and the chute 114 into the interior of the body 21.

SECOND EMBODIMENT

The numeral 201 designates a steel furnace body of approximately cubic box type. A furnace cover 203 disposed at the top of the body 201 is provided with a hopper 202 for feeding the powdered siliceous material 204. A pair of bar graphite electrodes 205 are positioned in alignment on both sides of the body 201. A suitable spacing is secured between the neighboring tips of the electrodes 205 so that, when conducting, a sufficient electric arc is generated. Arc heating in this case may be replaced by resistance heating. The bar electrodes 205 are supported by water-cooled insulators 206 and water-cooled electrode holders 207 disposed on both sides of the body 201 in such a manner that they are located horizontally and symmetrically relative to the vertical body 201. The holders 207 are fixedly disposed on electrode-conveying devices 208 so as to allow them to move with respect to the stationary body 201.

A water-cooled steel nozzle 210 is positioned at the bottom of the body 201. The bottom portions leading to the nozzle 210 are at an incline of 15 to 55 degrees with respect to the vertical axis of the body 201 in such a way that the melt 209 can easily be extruded through the nozzle 210. A large number of extrusion holes 211 are made in the slopes 201a, as shown in FIG. 6. At an incline of 20 to 30 degrees, however, no such holes are necessary.

A pair of radiators 212 prevent both the body 201 and steel nozzle 210 from overheating, nozzle 210 being disposed at the bottom of the body 201 in such a manner that the melt 209 flowing down into the bottom section can easily be extruded from the extrusion nozzle 210. The melt 209 extruded from the nozzle 210 is rolled along upon the surfaces of toothed rolls 213 deformed along the teeth due to the rolling effect, and securely clamped by the rolls 213. The rolls 213 are driven by a motor (not shown) at a predetermined speed to extrude a prescribed amount of melt 209 from the body 201. Water-cooled nozzles 215 are located right below nozzle 210 and spout out the cooled water to cool the melt 209 rapidly and guide it into the section of contact between the melt 209 and the rolls 213 while cooling the rolling surface by the groove of the specific tooth form. More water-cooled nozzles 216 are disposed underneath the rolls 213 to thereby provide for more rapidly cooling of the melt 209. The melt 209 so rolled is guided by the guide rolls 214 and extruded in the next process.

If the melt 209 has a poor degassing, the unmelted powder disposed above the gas collected everywhere on the surface and frequently falls down in the body 201. As a result, a mixture of melt and non-melt is sometimes extruded from the bottom of the furnace body and sometimes the temperature of the melt 209 is seriously affected thereby. Gas exhaust nozzle 220 is therefore made in the unmelted powder so as to remove the undesired gas before melting.

It should be noticed that the forced extrusion mechanism 213 of the invention has a variety of toothed rolls 213a through 213f as shown by FIG. 7 through FIG. 11.

Despite its rolling effect, the conventional roll or caterpillar has no practical application as a mechanism for extruding the melt 209 at a predetermined speed in the relationship between the amount of prepared melt and that of extruded melt. This invention is capable of enhancing the rolling effect by the use of rolls or caterpillars of the specific tooth form, capable of effecting a forced extrusion, and capable of making the extrusion rate constant.

Several methods may be employed for breaking off the solidified melt. One method is to clamp the solidified melt between opposed clamps, denoted by numerals 300 in FIG. 16 and then when so held, strike the lower portion with a pneumatic hammer. Another way is to direct the solidified column onto an inclined conveyor, such as conveyor 220a in FIG. 6, the infeed end of the conveyor being disposed below rolls 214.

OPERATION

On the foregoing description, the operation of the present device should be apparent. The cup 90 is disposed over the protruding lower end of the cooling sleeve 70. Also, the upper edge 73 of the cooling sleeve abutts the flange 28 of the furnace 20. Thereafter, raw material, such as sand, silica, or other siliceous material is fed, by conveyor 116, into the bin 115, whence it passing down chute 114 and into the interior of the body 21 and then moving downwardly through the cooling sleeve 70 and collecting in the cup 90. The filling operation is continued until the cup 90, the sleeve, 70, and the furnace 20 are filled with raw material A to the level indicated in FIG. 1.

Thereafter, an arc is struck between the electrodes 40 and the fusing of the siliceous material A is commenced. As the fusing continues, a globe G of melt is created which gradually grows in size, as more and more of the raw material A is converted into a molten viscous mass.

Figure 13:
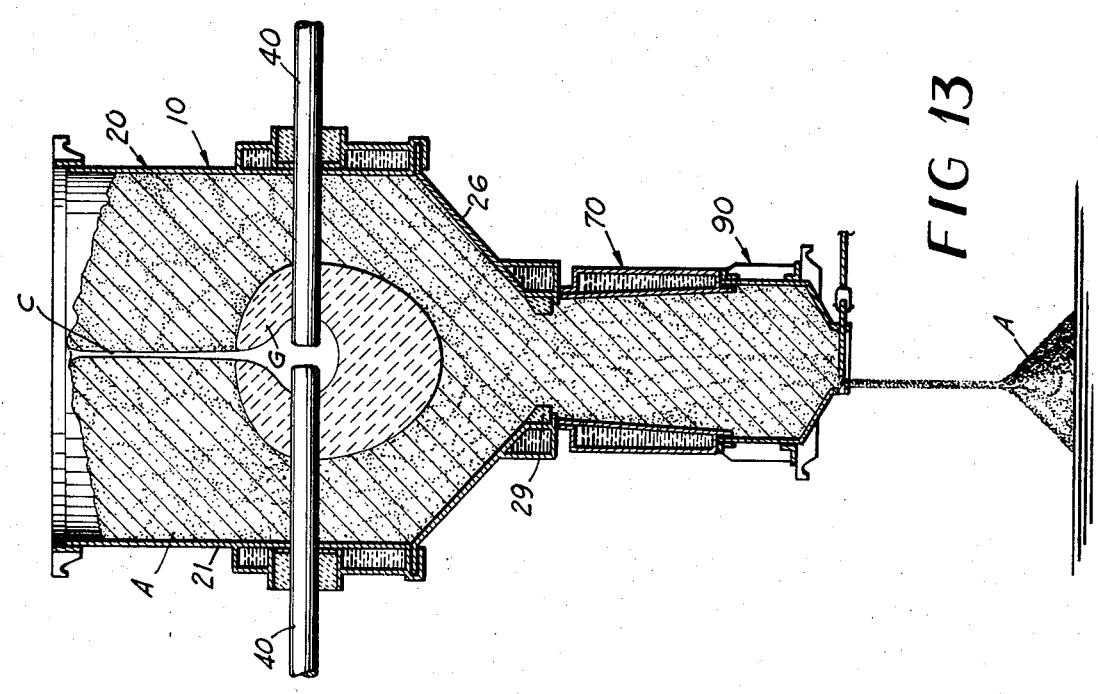
Figure 16:
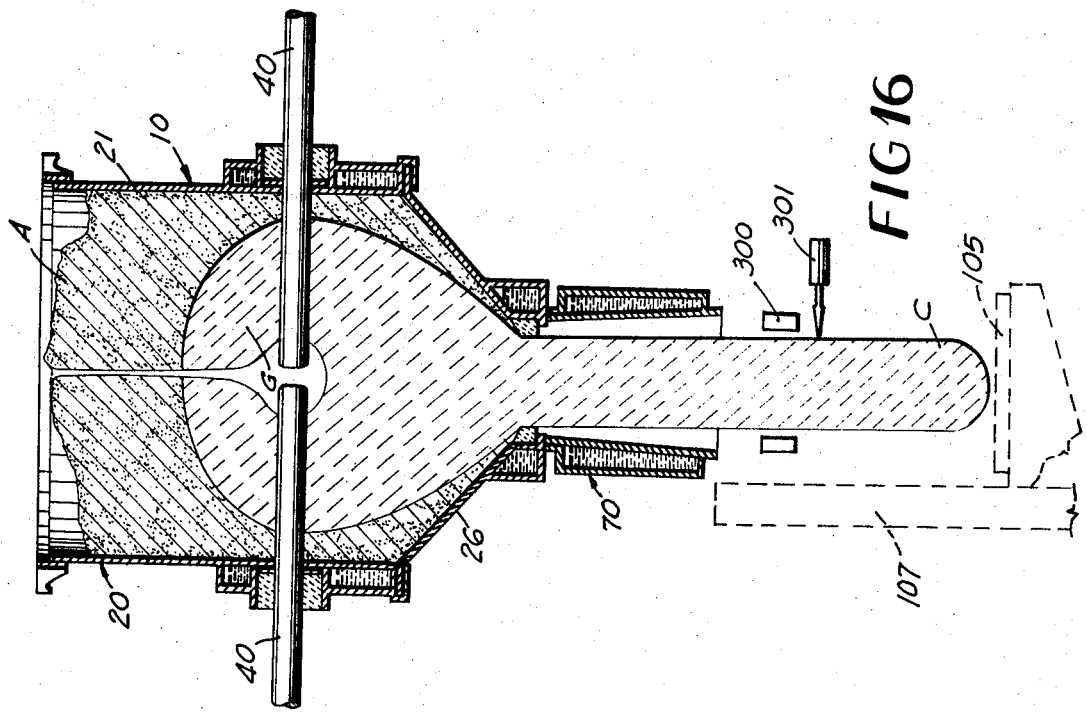

Periodically, the raw material will be bled from the bottom of the column of raw material by the opening and closing of the gate valve, i.e. plate 97. This is illustrated in FIG. 13. As the globe G begins to grow, the gases created by the arc and by the vaporization of the silica, create a chimney B in the molten material and in the raw material A. These gases are taken off through the hood 110.

Figure 15:
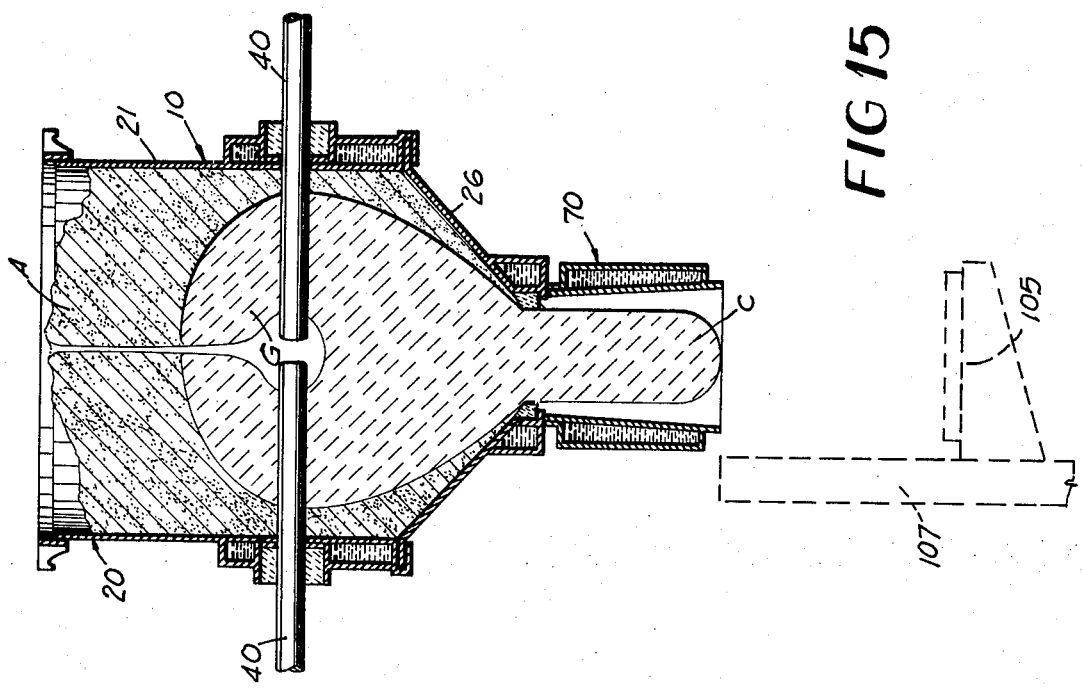

With continued periodic bleeding of the raw material from the bottom portion of the apparatus, and with continued growing of the globe due to additional melting of raw material, the melt gradually flows through the throat defined by lip 29 and eventually fills the annular space of the throat so as to restrict any substantial flow of raw material through the throat. Furthermore, the raw material, which is disposed below the emerging column passing through the throat of lip 29, is essentially separated from the raw material in the body 21. Thereafter, the raw material captured below the lip 29 may be bled quite rapidly from the apparatus so as to create a condition such as illustrated in FIG. 15. At that time, there is no necessity for further use of the cup or cap 90 and it may be lowered on the elevator and removed therefrom. Thus, the operation is now in the condition shown in FIG. 15.

With continued operation, the column C protrudes lower and lower and is received on the elevator which, in turn, is lowered gradually to provide support for this column C. After the raw material has been removed from the sleeve 90, the cooling water which is circulated therein, tends to cool and solidify the column C. As pointed out above when the column C has been lowered sufficiently, it can be broken or severed, using any desired method, such as the method described above. The passing of the exterior of the melt along the lip 29, tends to scrape the impurities from this surface and deposit the same along the inclined wall of bottom 26. This permits a relatively pure product to be produced substantially continuously. As the globe of melt grows, and ionization takes place within the interior, the electrodes may be withdrawn from each other so as to create a more efficient arc. Furthermore, the raw material can be fed gradually into the body 21 to make up for that material which has been converted to a fused state.

It is therefore seen that the present apparatus and method enables a substantially continuous operation. As the electrodes 40 begin to be used up, additional new electrodes may be screwed onto the threaded ends of the operating electrodes.

Periodically, of course, the operation must be shut down in order to clear out the impurities from along the bottom 26.

A better understanding of the present invention will be had by reference to the following specific examples.

EXAMPLE I 30-ton of silica granules as the raw material for silicic acid was fed into the body 201 through the hopper 202, the nozzle 210 being closed. An electric arc was then generated by electric citcuit through the electrode holders 207 to the prearranged 100-mm diameter bar graphite electrodes 205 and by adjusting the electrode-conveying devices 208. The volumetric heat capacity due to the generation of an arc was regulated by variation of the conductivity of the power supply (not shown) to varying the voltage. When conducting at 70 volts or less and in the range of 2,500 to 3,000 amperes for 10 min., there was gas generated between the two electrodes 205 thereby generating an approximately spherical silicon-dioxide melt 209 around the gas D.

When continuously melting at 100 volts and 3,500 amperes while opening nozzle 210 to drop a suitable amount of unmelted raw material at proper times, the melt 209 swelled in the lower part, as shown in FIG. 6. At 150 volts and 4,000 amperes, the melt 209 continued to grow until it reached the nozzle 210. The nozzle 210 was left open in order to continuously extrude the melt 209. The melt 209 was more easily extruded by flowing more rapidly, the unmelted raw material being interposed between the melt 209 and the slopes 201a through nozzles 211.

In this way, the melt 209 was continuously extruded from the nozzles 210 through the medium of the unmelted material, cooled by the cooling devices 215, 216 to be solidified, and cut, being slightly supported on the extruding devices 213, 214. The solidified portions were then finely ground by the ordinary grinder into powdered fused silica after completely removing the unmelted portions on the surface.

According to this invention, a considerably thick, large fused lump can be obtained by continuously melting while continuously feeding the powdered material from the hopper and extruding it from the nozzles while melting. Furthermore, there is almost no mixture of melt and carbon since the greater part of residual carbon contents generated by de-oxidation of the bar graphite electrodes is evaporated and removed in the form of carbon dioxide ($CO_2$).

EXAMPLE II 3-ton of silica granules as raw material for silicic acid were first fed into the furnace body 201 through the hopper 202 so as to be melted by an electric arc generated between the electrodes 205. When conducting at 70 volts or less and 2,500 amperes for about 10 minutes, an arc is generated, thereby forming a quasi-spherical melt 206 in the surroundings. While continuously melted at 100 volts and 3,500 amperes, the melt was made to grow gradually, bleeding the optimum amount of powdered siliceous material from the bottom of the furnace body. The melt 206 continues to flow downward and was extruded from the extrusion nozzle 210 at the bottom of the body 201. The melt 206 further flows down until it reaches a clamping position, where it was clamped by the toothed rolls 209. At that instant, the melt 206 was cooled to such an extent that rolling was made impossible. It was, therefore, necessary to appreciably increase the voltage and current and maintain the temperature as high as possible, as compared with those immediately before extrusion of the melt 206 from the nozzle 210. The optimum amount of extruded melt 206 was 500 Kg/hr. The melt 206 was continuously extruded, regulating the rotation of the rolls 209 and 210 by means of the stepless change gear so as to correspond to the amount of extrusion.

As previously described, the melt 206 was forcedly extruded according to this invention, so as to form an almost unvarying quasi-sphere consisting of melt and gas in the arc generating section, thereby stabilizing the furnace situation and causing much less variation in the voltage and current. The unmelted or semi-melted powder sticking to the surface of the melt was removed by stretching the melt, resulting in a better yield.

The contaminants or impurities in the melt tend to be cooler and collect along the outer surface of the melt as the molten material flows through the main body 21 and the sleeve 70. When the melt begins to flow through the throat of lip 29, a seal is formed around the lip 29. The rate of flow is greater through the middle of the molten mass so that only the relatively pure molten silica flows for creating column C. The differential movement of the contaminants and the pure molten silica is great enough to allow the resultant viscous flow to be free from the outer layer of contaminants. These contaminants are crystalline material and collect along the bottom 26.

The above described invention provides many distinct advantages over previous methods of producing fused silica. The first and probably most important advantage of this invention is that a relatively pure fused silica product is formed. The product is substantially without crystalline silica contaminants. Therefore, the product is ready to be crushed into grain fused silica without any further treatment to it. As described above, the contaminants that are present in the melt remain in the body 21 as the melt is removed therefrom. The resultant discharged melt is almost all fused silica with no contaminant skin attached. This obviates the need for peeling the contaminant skin from the cooled solidified melt.

Because almost no contaminants are present in the fused silica, the fused silica produced by this invention is more uniform and dense (i.e., gas-free) than fused silica produced by the old methods. There is usually a five per cent increase in the average density of the improved product, which is substantial for the silica art. The density of the fused silica more closely approaches the theoretical density of 2.2 than previously produced fused silica. As is known, the greater the density of the fused product, the greater the strength of the product. Therefore, a higher density is a much sought after advantage in this art. The product from the present invention gives a 20,000 p.s.i. failure strength under compression vs. a 6,000 p.s.i. failure strength under compression for fused silica produced by the previous methods.

Also, the grain density of the product is uniformly higher with a range of 2.1 to 2.2 grams per cubic centimeter gm./c.c. as opposed to the previous grain density range of 2.0 to 2.1 grams/c.c. and which has been as low as 1.9 gm./c.c. The average grain density of the fused silica produced by this invention is 2.14 gm./c.c.

Because the production of the fused silica is a continuous process in this invention and the apparatus is maintained in a relatively closed condition, there is a conservation of the heat generated by the electrical arc within the vessel 18 and less of a health hazzard. There is, therefore, a lower electrical power consumption by the electrodes 50, per pound of glass produced due to this conservation of heat within the body 21. Also the amount of electrodes 48 consumed per pound of glass produced is significantly reduced by this invention.

Another advantage of this invention over previous methods and apparatus for the liquefaction or fusion of silica is an increased production rate. An average of 1,000 lbs. per hour or more can be produced by the present invention as compared with an average of 600 pounds of fused silica per hour with the old method and apparatus.

Another advantage is that the raw material is used only once in this invention instead of recycling the unused material as has been done in the past. Since there is no recycling of the sand or raw material there is no concentration of impurities from the old sand, trapped with the new sand, as in the old process. The present invention also lowers the rate of raw material lost.

The invention also provides a labor saving method for the production of fused silica. In the old method one man produced, on the average, 14 pounds of fused silica per minute. With the present invention, the same man can now produce a minimum of 15 pounds of fused silica per minute.

Finally, the invention provides an apparatus which requires less maintenance than previous devices. This is true because the body 21 does not have to be cleaned out as often as the devices did under the old method of producing fused silica.

It is obvious that one skilled in the art may make modifications in the details of construction without departing from the spirit of the invention which is set out in varying scope in the appended claims.

What is claimed is:

1. An apparatus for the continuous liquefaction of a finely divided material capable of forming a highly viscous material when heated to a molten condition, comprising a hollow vessel having a bottom opening therein, means for introducing said finely divided material into said vessel, heating means for generating sufficient heat within said vessel to continuously form said viscous material, receiving and bleeding means disposed below said bottom opening for receiving and intermittently bleeding said finely divided material to start the continuous operation of said apparatus, said receiving and bleeding means including an opening therethrough aligned with said bottom opening and fixed relative thereto.

2. An apparatus as described in claim 1 wherein means are provided for cooling said vessel.

3. An apparatus as described in claim 1 wherein electrode feeding means are operatively associated with said pair of electrodes for maintaining a preselected gap between said pair of electrodes.

4. An apparatus as described in claim 1 wherein said vessel includes a main body, an inwardly and downwardly sloping bottom connected to the lower end portion of said body, said opening being at the lower portion of said bottom and cooling means for applying a coolant adjacent said bottom opening.

5. An apparatus as described in claim 3 wherein said electrode feeding means includes a movable carriage for each electrode, means on said carriage for securing said electrode to said carriage, tracks for supporting said carriage and along which said carriage moves, and means for moving said carriage a predetermined distance along said track.

6. An apparatus as described in claim 1 including means disposed above said vessel for feeding said finely divided material to said vessel.

7. An apparatus as described in claim 1 wherein said vessel further includes a refractory ring on said bottom for defining said bottom opening.

8. An apparatus as described in claim 1 said support means includes an elevator disposed beneath said vessel for successively engaging and supporting the lower portion of said viscous material as it flows from said vessel.

9. The apparatus in claim 1, wherein said heating means includes a pair of electrodes within said vessel in opposed relationship to each other for providing an electrical arc therebetween.

10. The apparatus in claim 1, wherein said receiving and bleeding means is removably attached to said vessel.

11. The apparatus in claim 1, wherein said receiving and bleeding means includes a sleeve having an axial opening therethrough, and further includes means for temporarily stopping the flow of material through said axial opening.

12. The apparatus in claim 1, wherein said receiving and bleeding means includes cooling means.

13. The apparatus in claim 12, wherein said cooling means includes a pair of concentric hollow sleeves attached to each other and forming a chamber therebetween.

14. The apparatus in claim 13, and further including means for circulating a coolant through said chamber.

15. The apparatus in claim 14, wherein said coolant is water.

16. The apparatus in claim 11, wherein said means for stopping the flow is a cap removably attached to the lowermost end of said cooling means.

17. The apparatus in claim 16, wherein said cap includes a cup-shaped member and a gate valve disposed in said cup-shaped member.

18. The apparatus in claim 1, and further including support means disposed below said cooling means for engaging and progressively lowering a column of said viscous material from said vessel at substantially the same rate said viscous material is formed.

19. An apparatus as described in claim 18 wherein said support means includes a pair of opposed extruding rollers engaging opposite sides of said column of viscous material.

20. An apparatus as described in claim 19 wherein said support means further includes a pair of smooth-surfaced rollers disposed beneath said extruding rollers and in alignment along said viscous material for guiding the water from said nozzles onto said viscous material.

21. An apparatus as described in claim 18 wherein said support means includes a conveyor disposed at an incline to said column of viscous material.

22. A method for the continuous liquefaction of finely divided material capable of forming a highly viscous material when heated to a molten condition, including the steps of:
introducing finely divided material into a hollow vessel having a constricted bottom opening with a pair of electrodes within said vessel in opposed relationship to each other, providing an electrical arc between said electrodes for generating sufficient heat to continuously form a globe of viscous material, removing a portion of said finely divided material from below said viscous material to produce a column of viscous material emerging from said opening, and thereafter periodically removing the bottommost portion of said column.

23. The method in claim 22, and further including the step of cooling said viscous material after it flows from said vessel.

24. The method in claim 23, wherein the step of cooling includes applying a cooling fluid directly to said viscous material.

25. The method in claim 23, wherein the step of cooling includes circulating a cooling fluid through a chamber that extends around said viscous material.

26. An apparatus for the continuous liquefaction of finely divided material capable of forming a highly viscous material when heated to a molten condition, comprising a hollow vessel having a bottom opening therein, means for temporarily closing said bottom opening, means for introducing said finely divided material into said vessel, heating means for generating sufficient heat within said vessel to continuously form said viscous material, means for cooling said vessel, said cooling means including a first cooling portion disposed around a portion of the exterior of said vessel, a second cooling portion extending around the bottom opening, and means for cooling said viscous material as it flows from said vessel.

27. The apparatus in claim 26, wherein said heating means includes a pair of electrodes within said vessel in opposed relationship to each other for providing an electrical arc therebetween.

28. The apparatus in claim 26, wherein said first portion is a chamber surrounding said vessel.

29. The apparatus in claim 28, and further including means for circulating a coolant through said chamber.

30. The apparatus in claim 29, wherein said coolant is water.

31. The apparatus in claim 26, wherein said second portion is a chamber surrounding said bottom opening.

32. The apparatus in claim 31, and further including means for circulating a coolant through said chamber.

33. The apparatus in claim 32, wherein the coolant is water.

34. The apparatus in claim 26, wherein said means for cooling said viscous material includes means for applying a cooling fluid directly to the viscous material.

35. The apparatus in claim 26, wherein said means for cooling said viscous material includes cooling means extending around said viscous material.

36. An apparatus for the continuous liquefaction of finely divided material capable of forming a highly viscous material when heated to molten condition, comprising a hollow vessel having a bottom opening therein, means for temporarily closing said bottom opening, means for introducing said finely divided material into said vessel, heating means for generating sufficient heat within said vessel to continuously form said viscous material, and support means for engaging and progressively lowering a column of said viscous material from said vessel at substantially the same rate as said viscous material is formed, said support means including an elevator disposed beneath said vessel for successively engaging and supporting the lower portion of said viscous material as it flows from said vessel.

37. The apparatus in claim 36, wherein said heating means includes a pair of electrodes within said vessel in opposed relationship to each other for providing an electrical arc therebetween.

38. An apparatus for the continuous liquefaction of finely divided material capable of forming a highly viscous material when heated to a molten condition, comprising a hollow vessel having a bottom opening therein, means for temporarily closing said bottom opening, means for introducing said finely divided material into said vessel, heating means for generating sufficient heat within said vessel to continuously form said viscous material, and means for applying a cooling fluid directly to said viscous material as it flows from said vessel.

39. The apparatus in claim 38, wherein said heating means includes a pair of electrodes within said vessel in opposed relationship to each other for providing an electrical arc therebetween.

40. The device in claim 38, wherein the cooling fluid is water.

41. The device in claim 38, wherein said means includes a plurality of nozzles disposed beneath the opening in the bottom of the furnace.

42. The device in claim 41, wherein a pair of toothed rolls is disposed beneath said plurality of nozzles, and further including means for clamping the melt between the rolls and turning the toothed rolls at a predetermined rate of speed.

43. The device in claim 42, wherein a second plurality of nozzles is disposed beneath the toothed rolls for applying a cooling fluid directly to the viscous material after it passes between the toothed rolls.

44. The device in claim 43, wherein a pair of rolls is disposed beneath the second plurality of nozzles, and further including means for clamping the melt between the rolls and turning the rolls at a predetermined rate of speed.

* * * * *